May 1, 1956        E. K. LOFTON        2,743,679
RAIL VEHICLE GENERATOR DRIVE
Filed Nov. 15, 1951
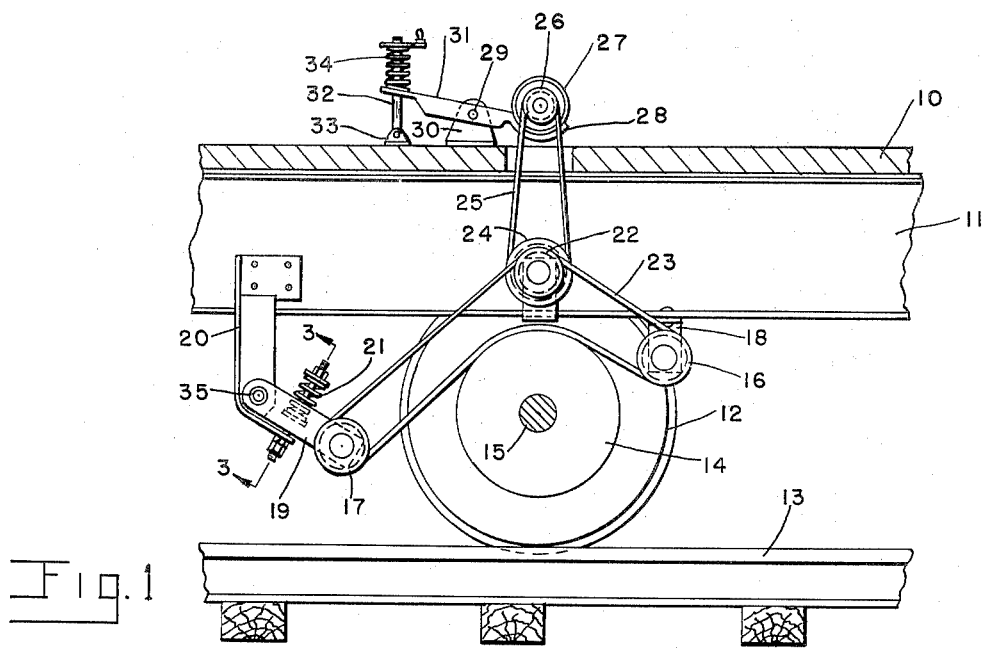
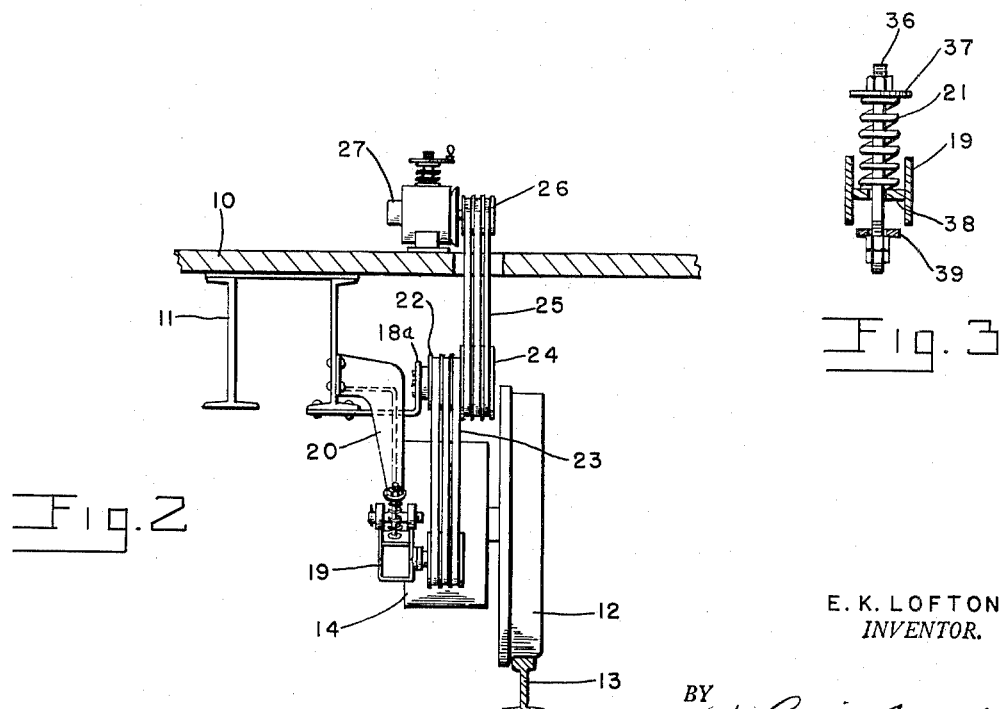
E. K. LOFTON
*INVENTOR.*
BY
ATT'Y.

United States Patent Office 2,743,679
Patented May 1, 1956

2,743,679

RAIL VEHICLE GENERATOR DRIVE

Edgar K. Lofton, Dayton, Ohio, assignor to The Dayton Rubber Company, a corporation of Ohio Application November 15, 1951, Serial No. 256,407

5 Claims. (Cl. 105—105)

The present invention relates to generator drives for vehicles and constitutes an improvement of Patent No. 2,456,518, dated December 14, 1948.

In the invention described in the aforesaid prior patent, a generator or alternator drive for railway vehicles, such as caboose or other rail cars, is provided by mounting the generator and idlers on the underframing of the vehicle, the generator being driven by means of a V-belt which is so positioned that the flat top surface forming the outer periphery of the belt is driven by a drum on the axle of the car. The idler pulleys maintain proper contact of the belt with the drum, and tension on the belt is provided by spring mounting of the generator.

In accordance with the present invention an arrangement of driving and driven pulleys and belts is provided which will permit mounting of the generator or alternator within the caboose or other car in such a manner that easy access thereto for repair, servicing, or replacement is permitted. This is accomplished by providing a pair of idler pulleys mounted on each side of the drum which is itself mounted on the car axle, together with an intermediate driven pulley which drives a horizontally mounted shaft. Upon this shaft is mounted one or more pulleys. The generator is positioned within the car, preferably near the floor thereof, and is driven by one or more pulleys mounted on the generator shaft. These pulleys are positioned opposite an opening in the floor of the car. One or more V-type belts are connected between the pulleys on the generator shaft and the pulleys mounted on the shaft beneath the car, which are driven by belts driven in turn by the axle drum. One or both of the idler pulleys are mounted with spring tensioning members as is the generator itself. In this way both sets of belts may be kept in proper tension. In the type of arrangement described, either endless belts or connector type belts may be used with appropriate pulleys.

Thus, a primary object of the present invention is the provision of an improved mounting for a generator or alternator whereby to obtain ready accessibility thereto for repair, servicing, or replacement, at the same time protecting the generator equipment from the elements.

A further object of the invention is the provision of an improved spring tensioning arrangement for both the pulleys and the generator.

A still further object of the invention is to provide more ready control of speed of rotation of the generator by permitting ready changes in drive pulley diameter.

Other objects and advantages of the present construction will be readily apparent from the following detailed description of the accompanying drawing wherein:

Figure 1 is a vertical side view partly in cross section showing the arrangement in which a generator is mounted above the floor of the car with the driving means positioned beneath the floor.

Figure 2 is a vertical end view partly in cross section along the plane at right angles to that in Figure 1.

Figure 3 is an enlarged sectional view taken on the line 3—3 of Figure 1.

Referring to the drawing in detail, numeral 10 indicates the floor of the caboose or other vehicle, suitably mounted on the usual vehicle frame 11. The vehicle wheel, indicated by numeral 12, is supported in conventional manner upon the rail 13. The driving drum or flat pulley 14 is suitably mounted on the wheel axle 15.

The V-type idler pulleys 16 and 17 are mounted respectively upon the mounting brackets 18 and 19. The bracket 18 is secured to the frame 11 and bracket 19 is carried by a hanger 20 secured to the vehicle frame 11. As seen in Figure 1, the bracket 19 is pivotally secured to the hanger 20 at 35 and normally rests upon plate 39 forming an extension of the hanger 20. As seen in Figure 3, the bracket 19 has a transverse portion 38 through which a threaded bolt 36 extends. The plate 39 is also apertured to receive the lower end of the threaded bolt 36 and adjusting nuts are threaded to each end of the bolt. A tensioning spring 21 is positioned about the bolt between the transverse portion 38 and a washer 37.

A pair of multiple V-type pulleys 22 and 24 are carried by a bracket 18a suitably secured to the frame 11. Positioned on the floor 10, adjacent an opening formed in the floor at a point above the multiple pulleys is a base 30 upon which a cradle mount 28 is pivotally supported by pivot pin 29. The cradle mount supports the generator or alternator 27 upon which a multiple pulley 26 is mounted. The term "generator" as used in this specification is intended to include conventional generators as well as the type of generating equipment known as "alternators." As seen in Figure 1, an adjusting mechanism is provided for properly adjusting the tension of the generator belts 25. The adjusting mechanism comprises a base 33 for supporting a screw 32 in a vertical position. The upper end of the screw is provided with an adjusting washer bearing against the spring 34 which in turn bears against the arm 31 of the cradle. The arm 31 may be bifurcated or apertured to receive the screw 32.

Mounted within the grooves of the pulley 26 are the generator belts 25 which serve to connect the pulley 26 with the pulley 24. Additional V belts 23 are mounted on pulley 22, idler pulleys 16 and 17 and engage the surface of the flat pulley 14. With the above described arrangement, both sets of belts may be kept in proper tension. The tensioning mechanism supported on base 33 is adjustable to insure proper tension on belts 25. Proper tension on belts 23 is insured by the tensioning mechanism carried by bracket 19. If desired, a similar tensioning mechanism may be mounted on bracket 18.

From the foregoing description, a simplified arrangement has been provided for mounting the generator above the floor of the caboose enabling ready repair or replacement. It is therefore apparent that the present construction is well adapted to accomplish the objects and advantages of the present invention. It will also be apparent that minor changes in the details of construction may be made without departing from the spirit of the invention.

I claim:

1. In combination in a rail vehicle generator drive having a generator mounted above the floor of the vehicle, a driving drum mounted upon an axle of a truck pivoted to the vehicle frame, V-type idler pulleys mounted on the frame of the vehicle on each side of the drum, a first driven pulley positioned between said idler pulleys, a belt engaging said idler pulleys and said first driven pulley and having its flat top surface engaging said drum whereby rotation of said drum will drive said first driven pulley, a second driven pulley driven by the rotation of the first driven pulley, said first and second driven pulleys being secured to said frame, a third driven pulley attached to the shaft of the generator, and a belt engaging said second and third driven pulleys and extending through an opening in the floor of the vehicle for effecting rotation of the generator shaft in response to rotation of the drum.

2. In combination in a vehicle generator drive having a generator mounted above the floor of the vehicle, a pulley mounted upon an axle of the vehicle, a pair of idler pulleys positioned beneath the floor of the vehicle one on each side of the axle pulley, a first driven pulley secured to the frame of said vehicle and positioned between said idler pulleys, a belt engaging said idler pulleys and said first driven pulley and having its flat top surface engaging the axle pulley, a second driven pulley positioned upon the same shaft as said first driven pulley, a generator pulley mounted upon said generator shaft and a belt engaging said second driven pulley and said generator pulley for driving said generator.

3. In combination in a generator drive wheeled vehicle, a generator mounted above the floor of said vehicle, a pulley attached to the shaft on said generator for driving same, a belt driving said generator pulley extending downward through an opening in the floor of said vehicle and engaging a pulley on a shaft mounted for rotation beneath said floor and secured to the vehicle frame, means for adjusting the tension of said belt, a second pulley on said last-mentioned shaft for driving same, and belt means driven by a flat pulley on a wheel of said vehicle driving said second pulley on said shaft, wherein said belt means comprises a V-belt having its wide outside surface in contact with said flat pulley.

4. In combination in a vehicle generator drive having a generator mounted above the floor of the vehicle, a pulley mounted upon an axle of the vehicle, a pair of idler pulleys positioned beneath the floor of the vehicle one on each side of the axle pulley, a first driven pulley positioned between said idler pulleys and secured to the vehicle frame, a belt engaging said idler pulleys and said first driven pulley and having its flat top surface engaging the axle pulley, means for adjusting the tension of said belt, a second driven pulley positioned upon the same shaft as said first driven pulley, a generator pulley mounted upon said generator shaft and a belt engaging said second driven pulley and said generator pulley for driving said generator.

5. In combination in a vehicle generator drive having a generator mounted above the floor of the vehicle, a pulley mounted upon an axle of the vehicle, a pair of idler pulleys positioned beneath the floor of the vehicle one on each side of the axle pulley, a first driven pulley positioned between said idler pulleys and positioned on a shaft secured to the vehicle frame, a V-belt engaging said idler pulleys and said first driven pulley and having its flat top surface engaging the axle pulley, a second driven pulley positioned upon the same shaft as said first driven pulley, a generator pulley mounted upon the generator shaft and a second belt engaging said second driven pulley and said generator pulley for driving said generator, adjusting means for controlling the positioning of at least one of said idler pulleys, and separate adjusting means for controlling the position of said generator pulley relative to said secured first and second driven pulleys, whereby the tension of said first and second belts may be separately adjusted.

References Cited in the file of this patent

UNITED STATES PATENTS

| | | |
|---|---|---|
| 615,905 | Richards | Dec. 13, 1898 |
| 1,703,530 | Hume | Feb. 26, 1929 |
| 1,706,563 | Dake | Mar. 26, 1929 |
| 2,292,952 | MacDonald | Aug. 11, 1942 |
| 2,456,518 | Lofton | Dec. 14, 1948 |

FOREIGN PATENTS

| | | |
|---|---|---|
| 830,713 | France | May 23, 1938 |